United States Patent [19]

Brunnett et al.

[11] 3,769,508

[45] Oct. 30, 1973

[54] AUTOMATIC DOT FACTOR SYSTEM FOR A SCINTILLATION DEVICE AND METHOD OF OPERATION

[75] Inventors: Carl J. Brunnett, Mayfield Heights; Basil N. Ioannou, Bedford, both of Ohio

[73] Assignee: Picker Corporation, Cleveland, Ohio

[22] Filed: June 23, 1972

[21] Appl. No.: 265,625

[52] U.S. Cl. .......................... 250/71.5 S, 250/71.5 R

[51] Int. Cl. .......................... G01t 39/18

[58] Field of Search .................... 250/71.5 S, 71.5 R

[56] References Cited

UNITED STATES PATENTS

| | | | |
|---|---|---|---|
| 3,683,184 | 8/1972 | Brunnett et al. | 250/71.5 S |
| 3,621,253 | 11/1971 | Barnes | 250/71.5 S |
| 3,549,887 | 12/1970 | Hansen | 250/71.5 S |

*Primary Examiner*—James W. Lawrence
*Assistant Examiner*—Harold A. Dixon
*Attorney*—Henry W. Collins et al.

[57] ABSTRACT

A scintillation scanner having a dot factor system for automatically spacing the dots which are printed by a color printer representative of radiation activity. The dot factor system utilizes circuitry for counting the number of signals which occur at a calibration point or "hot spot" for a predetermined number of intervals of time and then dividing the number of counted signals by the number of intervals of time to develop a calibrate signal having a high degree of statistical accuracy. The calibrate signal is then applied to a decoding and divider network for dividing the number of counts representative of radiation activity by a factor which is dependent upon the number of counts which occur at the calibration point to thereby provide optimum spacing between the printed dots for a given study.

14 Claims, 4 Drawing Figures

AUTOMATIC DOT FACTOR SYSTEM FOR A SCINTILLATION DEVICE AND METHOD OF OPERATION

CROSS REFERENCES TO RELATED PATENTS AND PATENT APPLICATIONS

U.S. Reissue Pat. No. Re 26,014, to Joseph B. Stickney et al., entitled, "Scintillation Scanner," issued on May 3, 1966, and assigned to the assignee of the present Application.

U.S. Pat. No. 3,159,744, to Joseph B. Stickney et al., entitled, "Scintillation Scanner Photo-Circuit," issued on Dec. 1, 1964, and assigned to the assignee of the present application.

U.S. Pat. application Ser. No. 660,823, to Carl J. Brunnett et al. entitled, "Scintillation Recording Device," filed on Aug. 15, 1967, and assigned to the assignee of the present application.

U.S. Pat. application Ser. No. 156,913, to Carl J. Brunnett et al., entitled "High Speed Color Printer for Scintillation Scanner," filed June 25, 1971 and assigned to the assignee of the present application.

U.S. Pat. application Ser. No. 156,912 to Carl J. Brunnett el al., entitled "Automatic Calibration System for a Scintillation Device and Method of Operation," filed June 25, 1971, and assigned to the assignee of the present application.

U.S. Pat. application Ser. No. 265,624 to Carl J. Brunnett et al., entitled "Automatic Limit Switch System for a Scintillation Device and Method of Operation," filed June 23, 1972, and assigned to the assignee of the present application.

U.S. Pat. application Ser. No. 265,481 to Carl J. Brunnett et al, entitled "Information Density Indicator for Digital Scanner and Method of Operation," filed June 23, 1972, and assigned to the assignee of the present Application.

BACKGROUND OF THE INVENTION

This invention pertains to the art of scintillation devices for providing a graphical presentation of the levels of radioactivity over an area, and more particularly, to an automatic dot factor system for establishing an optimum spacing between printed dots representative of the levels of radiation activity produced by an imaging device.

In the above-referenced patents to Stickney et al., a scintillation device of the type which is generally referred to as a scintillation scanner is disclosed. Generally, in the operation of a scintillation scanner, a scintillation probe is supported on a boom which reciprocates along a series of parallel rectilinear paths to cover a predetermined area of examination. A light source and a stylus are also carried by the boom to reciprocate along paths of travel which correspond to and are parallel to the path of travel of the probe. The light source and stylus are coupled through appropriate circuitry to the scintillation probe to produce graphic images formed by a pattern of dots, on both a film and a sheet of paper, of the levels of radiation activity being measured.

In the medical use of a scintillation scanner, a radioactive isotope is administered to a patient. Isotopes exhibit the characteristic of concentrating in certain types of tissue with the level of concentration dependent upon the type of tissue. These different levels of concentration result in different levels of radiation activity which, when measured and graphically presented, provide a basis for medical diagnosis. The levels of concentration of the isotopes are not only different in different tissues of a single organ, but are also different between similar tissues in similar organs. For this reason, the levels of maximum concentration, or maximum radiation activity, may vary over a wide range for different organs or even for two similar organs.

With the wide range of maximum concentrations, or maximum radiation activity, in human organs, it has been necessary to compensate or recalibrate the scintillation scanner for each study. In other words, if a scintillation scanner is calibrated such that 20,000 counts per minute produce dots which are properly spaced on the graphical presentation, levels of radiation activity in excess of 20,000 counts per minute would result in dots which are overlapping. With a color recording scintillation scanner, such as that disclosed in the above-referenced Application entitled "Scintillation Recording Device," the overlapping dots produce an area in which the color of adjacent dots are mixed to form an undesired color. Conversely, if the scanner is calibrated such that 30,000 counts per minute produce on the graphical presentation an indication of maximum density, and the actual maximum of radiation activity never exceeds 15,000 counts per minute during a given study, the graphical presentation will include dots which are spaced too far apart. For optimum results, the printed dots should be spaced as close as possible, without overlapping, at the point of maximum radiation activity, i.e., at the "hot spot," during a given study.

In the past, it was necessary to manually calibrate the dot factory for a scintillation scanner for each study so that the signals developed by the scanner are properly spaced in order to properly space the printed dots. This manual calibration was generally carried out by moving the detector probe over a "hot spot" and then attempting to read the scale of a rate meter in order to determine the approximate number of counts per minute occurring at the "hot spot." The reading taken from the rate meter was then used to compute the factor by which the number of counts should be divided so that the dots would be as closely spaced as possible, but not overlap, at the "hot spot."

As may be apparent, the procedure of visually reading a rate meter in order to calibrate a scintillation scanner inherently results in numerous calibration inaccuracies. For example, the rate meter readings vary over a rather wide range because of statistical variations in the number of counts per minute. Thus, the readings taken by an operator are at best an approximation of the average number of counts per minute. Also, the inertia in the meter movement of the rate meter adds another factor of inaccuracy to these measurements. In addition, manualy calibration of the scintillation scanner prior to each diganostic study is a very time consuming procedure.

SUMMARY OF THE INVENTION

The present invention is directed toward a dot factor system for a scintillation scanner for automatically spacing the dots representative of radiation activity which are printed by a print out device, thereby overcoming the noted disadvantages, and others, of such previous systems.

One aspect of the present invention is the provision of a radiation detector including circuitry for developing electrical pulses representative of the value of radiation activity, a counting circuit coupled to the detector for developing a calibrate signal having a value representative of the number of pulses received during a predetermined interval of time, a dot factor circuit coupled to the counting circuit for developing a factor signal, a divider circuit for developing an output signal equal to the number of electrical pulses received divided by the factor signal, and a print out device coupled to the divider circuit for providing an output presentation which takes the form of the pattern of discrete dots representative of the values of the output signals developed by the divider circuit to thereby provide a visual presentation of measured radiation activity.

In accordance with another aspect of the present invention, the divider circuit includes gating means for setting a binary point of the counting circuit.

DESCRIPTION OF THE PREFERRED EMBODIMENT

Figure 1:
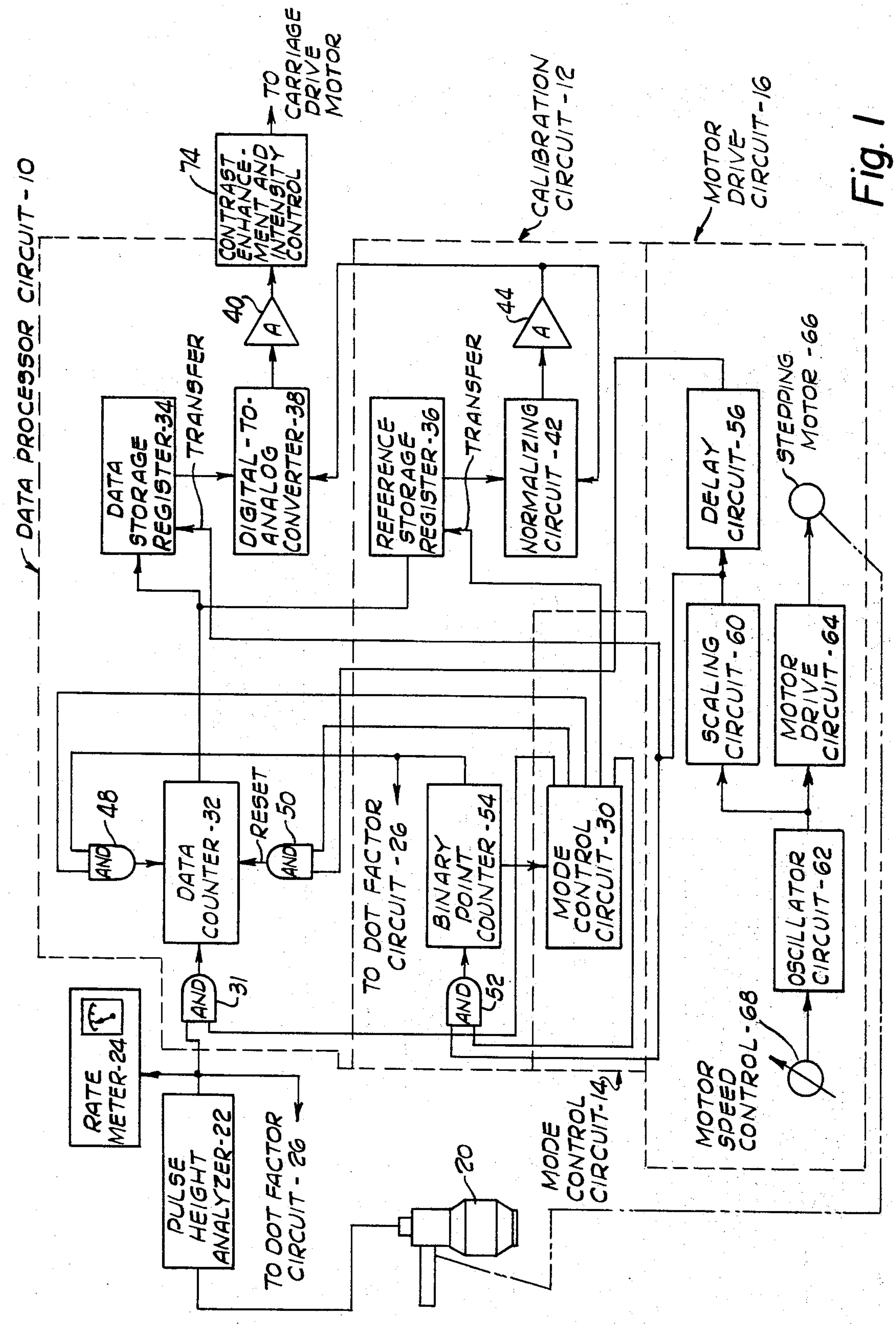
FIG. 1 is an electrical block diagram illustrating in basic form a scintillation scanner for use with the dot factor system of the present invention.

FIGS. 1 through 4 generally illustrate the dot factor circuit in a scintillation scanner system. The system comprises a data processor circuit 10, a calibration circuit 12, a mode control circuit 14, a motor drive circuit 16, the dot factor circuit 26, a data memory circuit 27, a solenoid drive circuit 28 and a printer solenoid 29.

Figure 2:
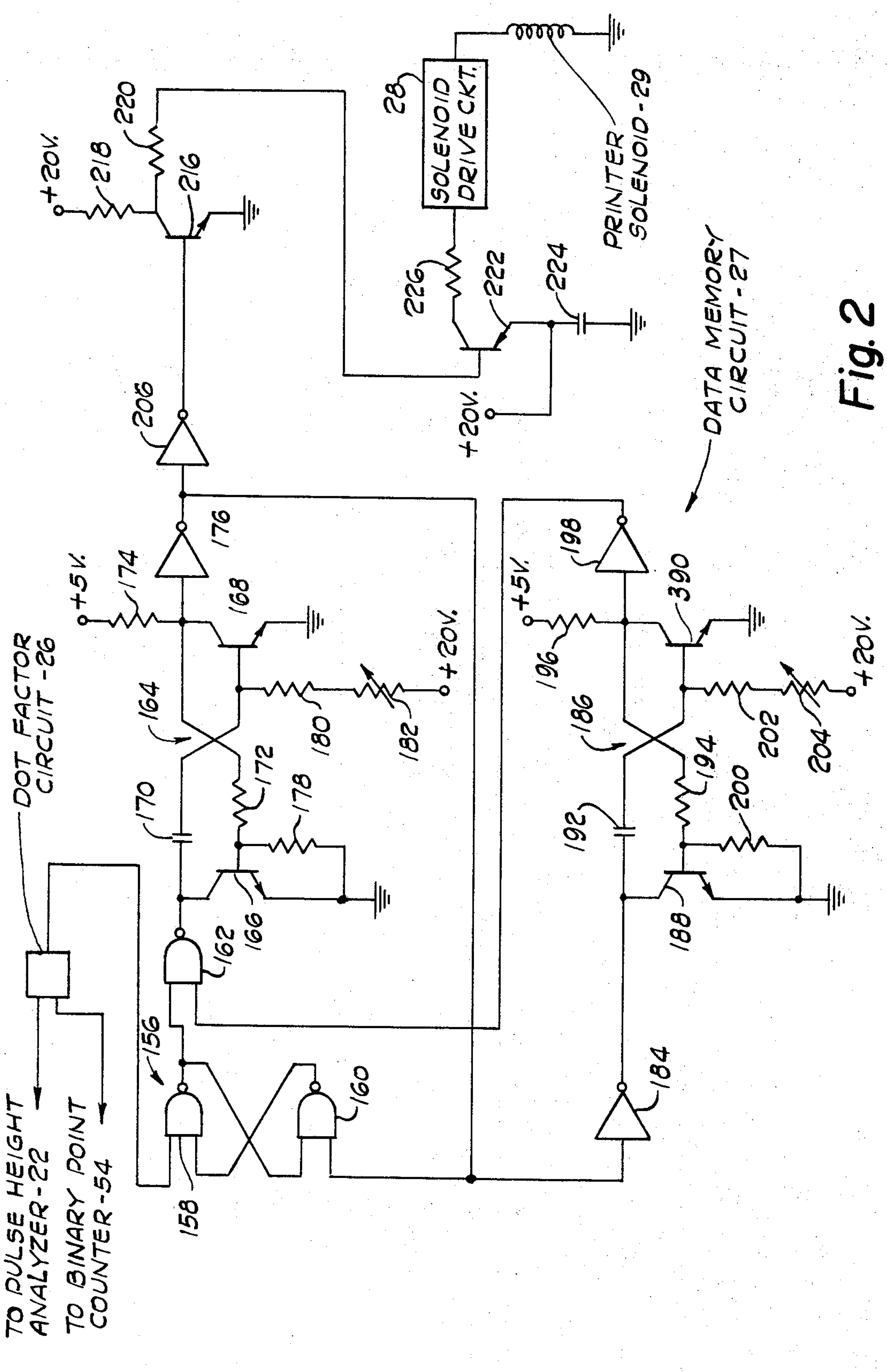
FIGS. 2 through 4 are electrical schematic diagrams illustrating in more detail the circuitry of the scintillation scanner as shown in FIG. 1 and the dot factor circuit.

More particularly, and with reference to FIGS. 1 and 2, the output terminal of a radiation detector probe 20 is coupled through a pulse heigh analyzer 22 to the input terminal of the data processor circuit 10. The output terminal of the pulse height analyzer 22 is also connected to a rate meter 24 and to the dot factor circuit 26. For a more detailed description of the radiation detector probe 20, pulse height analyzer 22, and rate meter 24, reference is made to the above-mentioned U.S. patent to J. Stickney et al.

As illustrated in FIG. 1, the output terminal of the pulse height analyzer 22 is connected to one of the input terminals of an AND gate 31 in the data processor circuit 10. The other input terminal of the AND gate 31 is connected to a mode control circuit 30. The output terminal of the AND gate 31 is connected to the input terminal of a data counter 32 and the output terminal of the data counter 32 is connected to the input terminals of a data storage register 34 and a reference storage register 36.

The output terminal of the data storage register 34 is connected to a digital-to-analog converter 38 having its output terminal connected to the input terminal of a differential amplifier 40. The output terminal of the reference storage register 36 is connected to the input terminal of a normalizing circuit 42 having its output terminal connected to the input of a differential amplifier 44. The output terminal of the differential amplifier 44 is fed back and connected to the digital-to-analog converter 38 and is also fed back and connected to the normalizing circuit 42 in order to modify the signals developed in these latter two circuits in response to the number of counts stored in the reference storage register 36.

The output terminal of the differential amplifier 40 is coupled through a contrast enhancement and intensity control 74 to a carriage drive motor (not shown) for moving a printer carriage.

The mode control circuit 30 generally comprises circuitry for gating appropriate ones of a plurality of AND gates in response to selected modes of operation, i.e., a "calibrate" mode and a "normal" mode of operation. The mode control circuit 30 also serves to strobe the data register 34 at the appleprate time to cause binary-coded-digital information to be transferred from the data counter 32 to the data register 34.

As illustrated, the mode control circuit 30, in addition to being connected to one of the input terminals of the AND gate 31, is also connected to one of the input terminals of the AND gates 48, 50, 52 and to the "transfer" terminal of the reference storage register 36. The other input terminal of the AND gate 48 is coupled to the output terminal of a binary point counter 54, the other input terminal of the AND gate 50 is coupled to the output terminal of a delay circuit 56 in the motor drive circuit 16, and the other input terminal of the AND gate 52 is coupled to an output terminal of a scaling circuit 60 in the motor drive circuit 16.

The AND gate 48 is shown as a single AND gate in FIG. 1 for purposes of illustration, but in practice this gate takes the form of a plurality of AND gates as will be described subsequently. The AND gate 48 serves the function of setting the binary point in the data counter 32 in respone to the number of counts contained in the binary point counter 54. As illustrated, the output terminal of the AND gate 50 is connected to the "reset" terminal of the data counter 32, and the output terminal of the AND gate 52 is connected to the input terminal of the binary point counter 54. Thus, the mode control circuit 30 serves the functions of 1) gating of the AND gate 31 to allow data to be transferred from the pulse height analyzer 22 to the data counter 32; 2) gating the AND gates represented by the AND gate 48 to allow the transfer of binary point data from the binary point counter 54 to the data counter 32; and 3) gating the AND gate 52 to allow data from the scaling circuit 60 to be transferred to the input of the binary point counter 54. Also, the mode control 30, in conjunction with the delay circuit 56, serves the function of gating the AND gate 50 to reset the data counter 32.

The output terminal of the binary point counter 54 is also connected to the dot factor circuit 26. The binary point counter 54 is connected to the mode control circuit 30, and the output terminal of the scaling circuit 60 is connected to the delay circuit 56 and to the "transfer" terminal of the data storage register 34.

The input terminal of the scaling circuit 60 is connected to the output terminal of a variable oscillator circuit 62. The output terminal of the variable oscillator circuit 62 is also coupled through a motor drive circuit 64 to s stepping motor 66 for controlling the movement of the detector probe 20 along a rectilinear path of travel. As illustrated, the frequency of the oscillator circuit 62 is controlled by a motor speed control 68 in order to vary the rate of travel of the probe 20. The motor speed control 68 not only varies the rate of travel of the probe 20, but also by establishing the frequency of oscillation of the oscillator circuit 62, selects the time interval at each location for counting data representative of radiation activity.

Reference is now made to FIG. 2 which illustrates the dot factor circuit 26, the data memory circuit 27, the solenoid drive circuit 28 and the printer solenoid 29. More particularly, the pulse height analyzer 22 is coupled to the dot factor circuit 26, which is in turn coupled to the data memory circuit 27. The dot factor circuit 26 is also connected to the binary point counter 54.

The data memory circuit 27 is comprised of a dual NAND gate flip-flop 156 which includes NAND gates 158, 160. The "reset" terminal of the flip-flop 156 is connected to the output terminal of the dot factor circuit 26 and the output terminal of the flip-flop 156 is coupled to one of the input terminals of an AND gate 162 having its output terminal connected to a variable frequency monostable multivibrator 164.

The monostable multivibrator 164 is comprised of a pair of NPN transistors 166, 168 having common grounded emitters. The collector of the transistor 166 is connected to the output terminal of the NAND gate 162 and is also coupled through a capacitor 170 to the base of the transistor 168. As illustrated, the collector of transistor 168 is connected through a resistor 172 to the base of transistor 166, is connected through a resistor 174 to a positive 5 volt supply source, and is also connected to the input terminal of an inverter 176. The base of transistor 166 is connected through a resistor 178 to ground, and the base of the transistor 168 is connected through a series-connected resistor 180 and variable resistor 182 to a positive 20 volt supply source. Thus, the pulse width of the monostable multivibrator 164 may be controlled by varying the resistance of the variable resistor 182.

The output terminal of the inverter 176 is fed back to one of the input terminals of the NAND gate 160, or the "set" terminal of the flip-flop 156. Additionally, the output terminal of inverter 176 is coupled through an inverter 184 to a second variable pulse width monostable multivibrator 186.

The monostable multivibrator 186 generally includes a pair of NPN transistors 188, 190 having common grounded emitters. The collector of transistor 188 is connected to the output terminal of the inverter 184 and is also coupled through a capacitor 192 to the base of the transistor 190. The collector of transistor 190 is connected through a resistor 194 to the base of transistor 188, is connected through a resistor 196 to the positive 5 volt supply source, and is also connected to the input terminal of an inverter 198. Additionally, the base of transistor 188 is connected through a resistor 200 to ground, and the base of transistor 190 is connected through a series-connected resistor 202 and variable resistor 204 to a positive 20 volt supply source. As mentioned above, the pulse width of the monostable multivibrator 186 may be controlled by varying the resistance and the variable resistor 204.

The output terminal of the inverter 198 is fed back and connected to an input terminal of the AND gate 162. The output terminal of the inverter 176 is connected to the input terminal of another inverter 206 having its output terminal connected to the base of an NPN transistor 216.

The collector of the transistor 216 is connected through a resistor 218 to the positive 20 volt supply source and is also connected through a resistor 220 to the base of a PNP transistor 222. In addition, the emitter of transistor 216 is connected directly to ground.

The emitter of transistor 222 is connected directly to the 20 volt supply source and is also connected through a capacitor 224 to ground. In addition, the collector of this transistor is connected through a resistor 226 to the input terminal of the solenoid drive circuit 28 having its output terminal connected to the printer solenoid 29 for energizing the printer solenoid. For a more complete description of various ones of the circuits illustrated in FIGS. 1 and 2, such as the digital-to-analog converter 38, normalizing circuit 42, contrast enhancement and intensity control circuit 74, solenoid drive circuit 28, and printer solenoid 29, reference is made to the above-mentioned patents to Brunnett et al.

Figure 3:
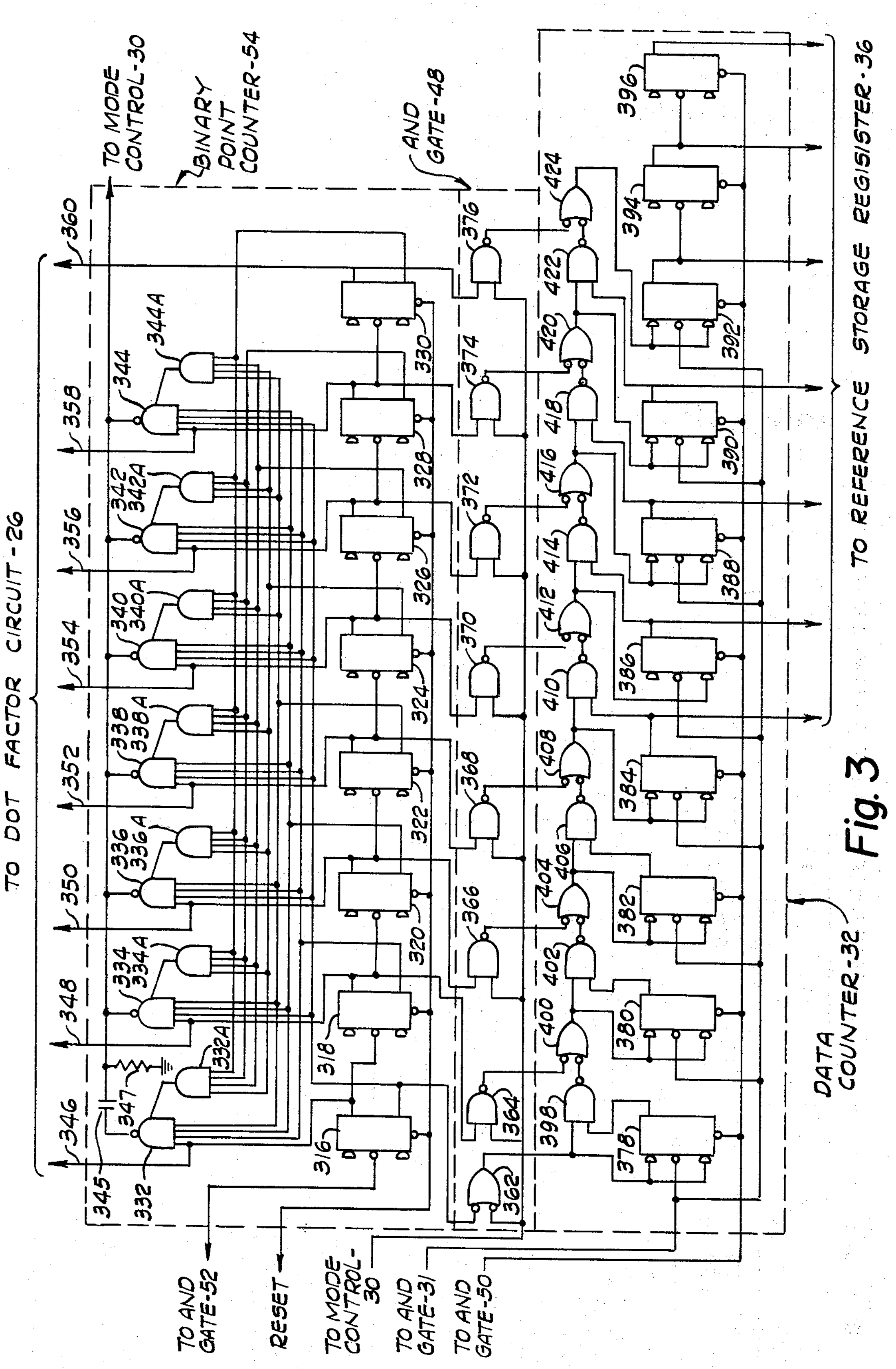

FIG. 3 illustrates in more detail the circuitry of the data counter 32, reference storage register 36, AND gates 48, and binary point counter 54. More particularly, the binary point counter 54 is comprised of eight J-K flip-flops 316, 318, 320, 322, 324, 326, 328, 330. The 1 terminal of each of the flip-flops 316 through 330 is connected to the "toggle" terminal of the following flip-flops and the "reset" terminals of these flip-flops are connected in common to the mode control circuit 30.

The binary point counter 54 also includes seven four-input gates 332, 334, 336, 338, 340, 342, 344, each having an associated four-input expander 332A, 334A, 336A, 338A, 340A, 342A, 344A. The output terminals of the four-input gates 334 through 344 are connected in common to the mode control circuit 30. The output terminal of four-input gate 332 is coupled through a capacitor 345 to the output terminal of gate 334 and is also connected through a resistor 347 to ground.

The 1 terminals of each of the J-K flip-flops 316 through 328 are each connected to one of the input terminals of the four-input gates 332 through 344, respectively. The 0 terminal of flip-flop 316 is connected to one of the input termnals of the gates 334 through 344. The 0 terminal of the flip-flop 318 is connected to one of the input terminals of the gates 332, and 336 through 344, and the 0 terminal of the flip-flop 320 is connected to one of the input terminals of the gates 332, 334, and 338 through 344. Also, the 0 terminal of the flip-flop 332 is connected to one of the input terminals of the gates 332 through 336 and 340 through 344, the 0 terminal of flip-flop 324 is connected to one of the input terminals of the expanders 332A through 338A, 342A and 344A, the 0 terminal of the flip-flop 326 is connected to one of the input terminals of the expanders 332A through 340A, and 344A, and the 0 terminal of the flip-flop 328 is connected to one of the input terminals of the expanders 332A through 342A. The 0 terminal of the flip-flop 330 is connected to one of the input terminals of the expanders 332A through 344A.

The 1 terminals of the flip-flops 316 through 330 also provide the output terminals 346, 348, 350, 352, 354, 356, 358, 360, respectively, which are coupled to the dot factor circuit 26. Additionally, the 0 terminal of the flip-flop 316 is connected to one of the input terminals of a NOR gate 362. The 1 terminals of the J-K flip-flops 318 through 330 are respectively coupled to one of the input terminals of a corresponding one of seven NAND gates 364, 366, 368, 370, 372, 374, 376. The other input terminal of the NOR gate 362 and the other input terminal of the NAND gates 364 through 376 are connected in common to the mode control 30. Thus, the NOR gate 362 and the NAND gates 364 through 376 and their associated circuitry generally comprise the AND gate 48 as illustrated in FIG. 1.

The data counter 32 is geneally comprised of 10 J-K flip-flops 378,380,382,384,386,388,390,392,394,396 which are connected as a parallel counter. Accordingly, the "toggle" terminals of each of the flip-flops 378 through 396 are connected in common to the output of AND gate 31 and the "reset" terminals of these flip-flops are connected in common to the output of AND gate 50. The 1 terminal of the flip-flop 378 is connected to one of the input terminals of a NAND gate 398 having its output terminal connected to one of the input terminals of a NOR gate 400. The other input terminal of the NAND gate 398 is connected to the output terminal of the NOR gate 362 and the other input terminal of the NOR gate 400 is connected to the output terminal of the NAND gate 364. The output terminal of NOR gate 362 is also connected to the input terminals of the flip-flop 378 and the output terminal of the NOR gate 400 is connected to the input terminls of the flip-flop 380.

The output terminal of NOR gate 400 is also connected to one of the input terminals of a NAND gate 402 having its output terminal connected to one of the input terminals of a NOR gate 404. The other input terminal of the NAND gate 402 is connected to the 1 terminal of flip-flop 380 and the other input terminal of the NOR gate 404 is connected to the output terminal of NAND gate 366.

The output terminal of NOR gate 404 is connected to the input terminals of the flip-flop 382 and to one of the input terminals of a NAND gate 406 having its output terminal connected to one of the input terminals of a NOR gate 408. The other input terminal of NAND gate 406 is connected to the 1 terminal of flip-flop 382 and the other input terminal NOR gate 408 is connected to the output terminal of NAND gate 368. The output terminal of NOR gate 408 is connected to the input terminals of the flip-flop 384 and to the input terminal of a NAND gate 410 having its output terminal connected to one of the input terminals of a NOR gate 412. The other input terminal of NAND gate 410 is connected to the 1 terminal of flip-flop 384 and the other input terminal of NOR gate 412 is connected to the output terminal of NAND gate 370.

Similarly, the output terminal of NOR gate 412 is connected to one of the input terminals of the flip-flop 386 and to one of the input terminals of a NAND gate 414 having its output terminal connected to one of the input terminals of a NOR gate 416. The other input terminal of NAND gate 414 is connected to the 1 terminal of flip-flop 386 and the other input terminal of NOR gate 416 is connected to the output terminal of NAND gate 372. In a similar manner, the output terminal of NOR gate 416 is connected to the input terminals of flip-flop 388 and to one of the input terminals of NAND gate 418 having its output terminal connected to a NOR gate 420. The other input terminal of NAND gate 418 is connected to the 1 terminal of flip-flop 388 and the other terminal of NOR gate 420 is connected to the output terminal of NAND gate 374.

The output terminal of NOR gate 420 is connected to the input terminals of a flip-flop 390 and to one of the input terminals of a NAND gate 422 having its output terminal connected to one of the input terminals of a NOR gate 424. The other input terminal of NAND gate 422 is connected to the 1 terminal of flip-flop 390 and the other input terminal of NOR gate 424 is connected to the output terminal of NAND gate 376. The output terminal of NOR gate 424 is connected to the input terminals of the flip-flop 392 and the 1 terminal of this flip-flop is connected to the "toggle" terminal of the flip-flop 394. Similarly, the 1 terminal of flip-flop 394 is connected to the "toggle" terminal of flip-flop 396. As illustrated, the 1 terminals of flip-flops 384, 386, 388, 390, 392, 394, 396 provide the input terminals of the reference storage register 36.

During the calibrate mode of operation, both the binary point counter 54 and the data counter 32 are initially reset. A binary 0 signal is applied to the NOR gate 362 and the NAND gate 364 through 376 so that counting in the data counter begins at the first stage, i.e., with flip-flop 378.

Once the detector probe 20 has been positioned over a "hot spot," or alternatively, any desired calibration point, the data counter 32 begins counting the pulses in the train of electrical pulses developed by the detector probe 20. Simultaneously, the binary point counter 54 counts the output signals developed by the scaling circuit 60 through the AND gate 52. The AND gates 31 and 52 are closed when the above-mentioned conditions of a total count in the data counter 32 being equal to or greater than 256 and the binary point counter 54 having attained a count of $2^N$ where N is an integer. These conditions are met when the output of flip-flop 396 attains a binary 1 level and when only one of the flip-flops 316 through 330 in the binary point counter 54 is in a "set" condition.

The gates 332, 344 and the expanders 332A through 344A sense the condition of the binary point counter 54 and when one of the flip-flops 316 through 330 is in a "set" condition, a signal is applied to the mode control 30, assuming the line 102 has attained a binary 1 level for closing the AND gates 31 and 52 to prevent further counts from being applied to the data counter 32 and the binary point counter 54, respectively. The count attained by the data counter 32 is then applied to the reference storage register 36.

During the normal scanning operation, the AND gate 52 remains closed and the AND gate 31 again opens to allow pulses from the detector probe 20 to be applied through the pulse height analyzer 22 to the data counter 32. At this point, a binary 0 signal is applied to the NOR gate 362 and the NAND gates 364 through 376 which allows the flip-flop in the binary point counter 54 which is in the "set" condition to establish the binary point or starting point in the data counter 32. Thus, during the scanning mode of operation, the data counter commences counting at that counting point or binary point and continues to count for each interval of time. The data counter 32 is again reset by a signal developed by the delay circuit 56 after the completion of a predetermined counting interval.

Figure 4:
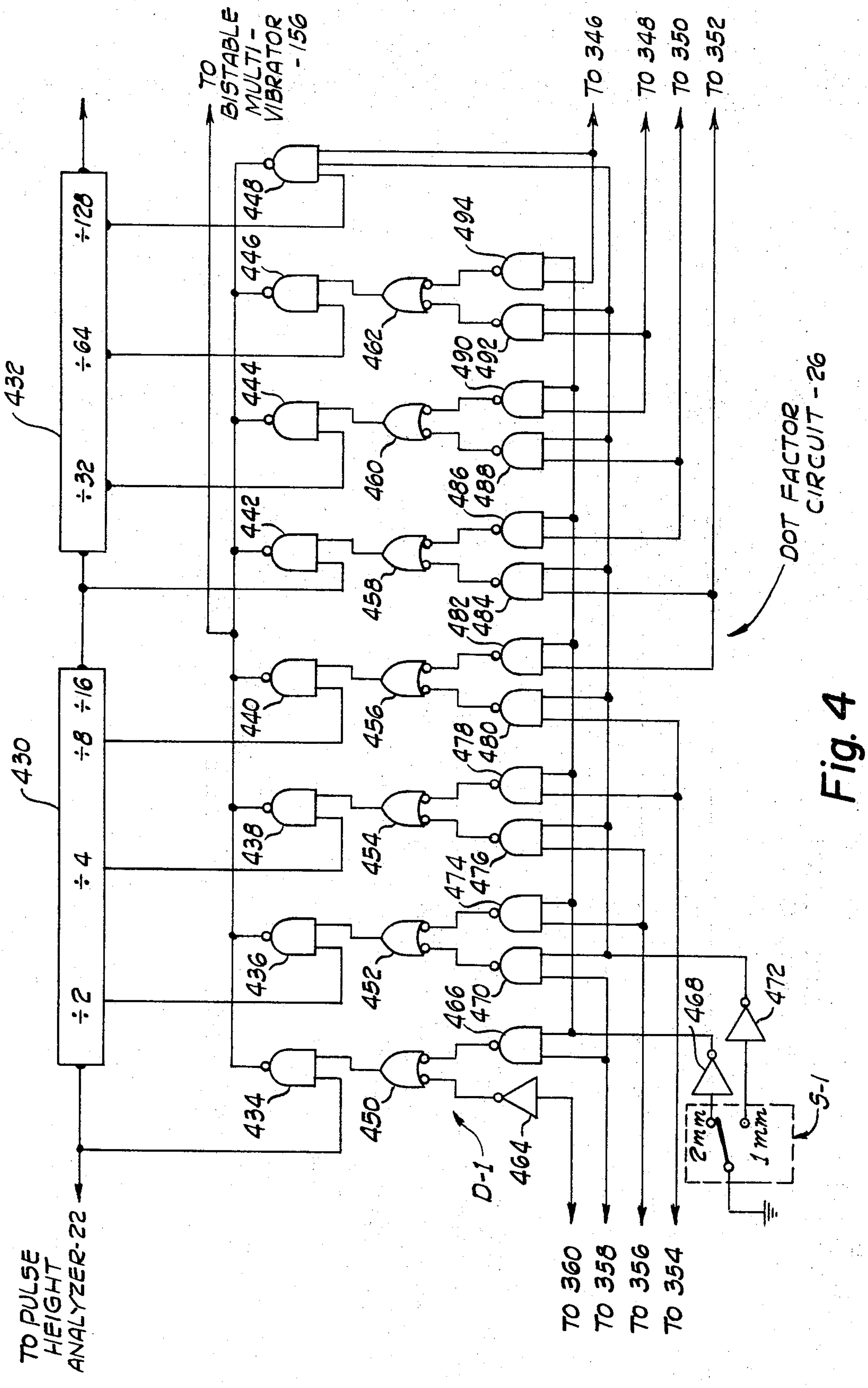

Reference is now made to FIG. 4 which illustrates in more detail the dot factor circuit 26 which generally comprises a dot factor switch S–1, a decoding network D–1, and a pair of four-stage counters 430, 432.

More particularly, the decoding network D–1 includes eight NAND gates 434,436,438,440,442,444,446,448, having their output terminals connected in common to the monostable multivibrator 164. One of the input terminals of each of the NAND gates 434 through 446 is connected to the output terminal of one of seven NOR gates 450,452, 454, 456, 458, 460, 462, respectively.

The other input terminal of the NAND gate 434 is connected directly to the pulse height analyzer 22 and to the input terminal of the counter 430. The other input terminal of the NAND gate 436 is connected to the "divide-by-two" terminal of the counter 430, and the other input terminal of the AND gate 438 is connected to the "divide-by-four" terminal of the counter 430, and the other input terminal of the NAND gate 440 is connected to the "divide-by-eight" terminal of the counter 430.

The "divide-by-16" terminal of the counter 430 is connected in common with the other input terminal of the NAND gate 442 to the input terminal of the second counter 432. In addition, the other input terminal of NAND gate 444 is connected to the "divide-by-32" terminal of the counter 432, the other input terminal of the NAND gate 446 is connected to the "divide-by-64" terminal of the counter 432 and one of the input terminals of the NAND gate 448 is connected to the "divide-by-128" terminal of the counter 432.

One of the input terminals of the NOR gate 450 is connected to the output terminal of an inverter 464 having its input terminal connected directly to the output terminal 360 of the binary point counter 54. The other input terminal of the NOR gate 450 is connected to the output terminal of a NAND gate 466 having one of its input terminals connected directly to the output terminal 358 of the binary point counter 54 and the other input terminal of this gate is connected to the output of inverter 468 having its input connected to one of the stationary contacts of a single-pole, double throw dot factor selector switch S–1. The movable contact of the switch S–1 is connected directly to ground. One of the input terminals of the NOR gate 452 is connected to the output terminal of a NAND gate 470 having one of its input terminals connected directly to the output terminal 358 of the binary point counter 54 and its other output terminal connected to the cathode of a diode 472 having its anode connected directly to the other stationary contact of the dot factor selector switch S–1.

The other input terminal of the NOR gate 452 is connected to the output terminal of a NAND gate 474 having one of its input terminals connected directly to the output terminal 356 of the binary point counter 54 and its other input terminal connected to the output of the inverter 468.

One of the input terminals of the NOR gate 454 is connected to the output terminal of a NAND gate 476 having one of its input terminals connected to the output terminal 356 of the binary point counter 54 and its other output terminal connected to the output of inverter 472. The other input terminal of the NOR gate 454 is connected to the output terminal of another NAND gate 478 having one of its input terminals connected to the output terminal 354 of the binary point counter 54 and its other output terminal connected to the output of inverter 468.

One of the input terminals of the NOR gate 456 is connected to the output terminal of a NAND gate 480 having one of its input terminals connected to the output terminal 358 of the binary point counter 54 and its other input terminal connected directly to the output of inverter 472. The other input terminal of the NOR gate 456 is connected to the output terminal of another NAND gate 482 having one of its input terminals connected to the output terminal 352 of the binary point counter 54 and its other input terminal connected to the output of the inverter 468.

As illustrated, one of the input terminals of the NOR gate 458 is connected to the output terminal of a NAND gate 484 having one of its input terminals connected to the output terminal 352 of the binary point counter 54 and its other input terminal connected to the output of an inverter 472. The other input terminal of the NOR gate 458 is connected to the output terminal of NAND gate 486 having one of its input terminals connected to the output terminal 350 of the binary point counter 54 and its other input terminal connected to the output of an inverter 468.

Similarly, one of the input terminals of the NOR gate 460 is connected to the output terminal of a NAND gate 488 having one of its input terminals connected to the output terminals 350 of the binary point counter 54 and its other input terminal connected to the output of the inverter 472. The other input terminal of the NOR gate 460 is connected to the output terminal of a NAND gate 490 having oen of its input terminals connected to the output terminal 348 of the binary point counter 54 and its other input terminal connected to the output of the inverter 468.

In addition, one of the input terminals of the NOR gate 462 is connected to the output terminal of a NAND gate 492 having one of its input terminals connected to the output terminal 348 of the binary point counter 54 and its other input terminal connected to the output of the inverter 472. The other input terminal of the NOR gate 462 is connected to the output terminal of a NAND gate 494 having one of its input terminals connected in common with one of the input terminals of the NAND gate 448 and with the output terminal 346 of the binary point counter 54. The other input terminal to the NAND gate 494 is connected to the output of the inverter 468. A third input terminal of NAND gate 448 is also connected to the output of the inverter 472.

In the operation of the automatic calibrate system, the mode control 30 is set to "calibrate" which causes signals to be applied to the AND gates 31 and 52 thereby causing these gates to open and allow data to be transferred through the gates. During the calibrate mode, the AND gates 48 and 50 remain closed thereby preventing the transfer to data through these gates.

For automatic calibration, the detector probe 20 is manually positioned over the organ under examination until a maximum reading is obtained by the indicator on the rate meter 24. The electrical pulses developed by the detector probe 20 are then applied through the pulse height analyzer 22 and the AND gate 31 to the data counter 32. The data counter 32 begins counting electrical pulses in the train of pulses for a predetermined integration interval or integration distance.

The integration interval terminates on the occurrence of two events, to wit, the data counter has completed a count of at least 256 counts and the binary point counter 54 has reached a count of $2^N$ where N is an integer. In other words, the data counter 32 continues to count data representative of radiation activity at the "hot spot" until the number of counts in the data counter 32 and binary point counter 54 have satisfied the required conditions.

Once the required conditions have been satisfied, AND gates 31 and 52 are closed thereby preventing additional data from being transferred into the data counter 32 and the binary point counter 54. The binary data in the data counter 32 is then transferred to the reference storage register 36 where that information is then stored. Signals representative of the data count stored in the refernce storage register 36 are then applied to the normalizing circuit 42, which in turn applies an analog signal through the amplifier 44 to the digital-to-analog converter 38 to modify the signals developed by the digital-to-analog converter 38 during the normal scanning operation.

For normal scanning operation, the mode control 30 is set at "normal operation" which causes the AND gate 31, 48 and 50 to open and the AND gate 52 to remain closed. During normal scanning operation, data from the pulse height analyzer 22 is applied through the AND gate 31 to the data counter 32. The data counter 32 is allowed to count for an integration interval or integration distance which is selected by the motor speed control 68. Thus, after a predetermined number of oscillations by the oscillator circuit 62, the scaling circuit 60 develops a pulse which causes data to be transferred from the data storage register 34 to the digital-to-analog converter 38. After a preselected interval of time, the delay circuit 56 develops a pulse which is applied through the AND gate 50 to reset the data counter 32 for another counting operation over a second time interval. Each time interval is equal to the time the detector probe 20 travels a predetermined incremental distance. The data counter 32 is reset at a predetermined delay time after actuation of the stepping motor 66 to the next incremental position.

The binary information from the data storage register 34 is applied to the digital-to-analog converter 38. The converter 38 develops an analog signal having a value representative of the pattern of binary signals applied to the converter. The analog signal developed by the digital-to-analog converter 38 is modified by the signal developed by the amplifier 44 in the calibration circuit 12 so that the analog signal developed by the converter 38 remains within a predetermined range of values even though this signal has a value representative of the data applied to the converter by the data storage register 34.

The analog signal developed by the digital-to-analog converter 38 is applied through an amplifier 40 and through the contrast enhancement control 74 to the carriage drive motor.

Thus, the detector probe 20 is positioned over an area of maximun radiation activity or a "hot spot," the probe 20 develops a train of electrical pulses representative of the level of radiation activity measured by the detector, and the data counter 32 counts the number of pulses for a preselected number of intervals of time. The number of counts developed by the data counter 32 is then divided by the number of intervals of counting time by the binary point counter 54 in order to obtain an average number of electrical pulses occurring in one interval of time. By counting over several intervals of time, the average number of electrical pulses may be determined with a high degree of statistical accuracy.

Data representative of the average number of electrical pulses occurring in one interval of time is then stored in the reference storage register 36 and is applied to the normalizing circuit 42 for modifying the signals developed by the analog converter 38 during normal scanning operation. In the normal scanning operation, the radiation detector probe 20 moves along a rectiliner path of travel and is moved for incremental distances after a preselected number of oscillations by the oscillator circuit 62. Each time the detector probe 20 is moved an incremental distance, data which has been accumulated in the data counter 32 at the previous detector location is transferred from the data storage register 34 to the digital-to-analog coverter 38. The signal developed by the digital-to-analog converter 38 is modified by the modifying circuit 42 and its associated amplifier 44 so that the value of the output signal developed by the digital-to-analog converter 38 remains within a predetermined range of values and remains representative of the number of counted pulses accumulated at each detector position.

The signals developed by the pulse height analyzer 22 are applied to the dot factor circuit 26 and are modified by the data in the binary point counter 54.

In operation, the dot factor circuit 26 performs the function of scaling down the data pulses by a factor dependent upon the speed of travel and count rate of the radiation detection probe 20. The operation of scaling down the data pulses is performed by the decoding network D–1 and the pair of four-stage counters 430, 432 to thereby provide scale-down factors of $2^N$, i.e., 1 2, 4, 8, 16, 32, 64, 128 and 256. The selection of the factor by which the data pulses are scaled down, i.e., the dot factor, is performed by the binary point counter 54 and the decoder network D–1 in the dot factor circuit 26.

Accordingly, based upon an approximate dot separation of 0.05 centimeters for the color tapper which is energized by the printer solenoid 29, the equation for the dot factor would be:

$$D.F. = \frac{0.05 \times \text{count rate in counts per minute}}{\text{speed of travel of detection probe in centimeters per minute}}$$

Based upon the fact that the available dot factors are of the form $2^N$ where N equal 0, 1, 2, 3, et cetera, the dot factor is calculated to the closest $2^N$ number. For example, for a calibrated dot factor of 20, the effective dot factor would be $2^4$ or 16. Thus, if the count rate equals 20,000 counts per minute and the speed equals 100 cm. per minute, the calculated dot factor would be:

$$D.\ F. = (0.05 \times 20{,}000)/50 = 20$$

The effective dot factor would then be equal to 16.

More particularly, if the number of counts per unit of time is for example 16 to 31, the binary point developed by the binary point counter 54 would be 5 thereby causing the signal applied to line 454 in the binary point counter to take the form of a binary 1 signal. With a binary 1 signal applied to the line 454, a binary 1 signal would be applied to one of the input terminals of the NAND gates 478, 480. Assuming that the scaling switch S–1 is set at the 2 mm. position, a binary 1 signal would also be applied to the other input terminal of the NAND gate 476 to thereby cause a binary 1 signal to be applied to the NOR gate 454.

With a binary 1 signal applied to one of the terminals of the NOR gate 454, the output signal developed by this gate takes the form of binary 1 signal, which in turn applied to one of the input terminals of the NAND gate 438. The binary 1 signal applied to the NAND gate 438 causes this gate to be "open." Thus, a single data signal will be applied to the monostable multivibrator 164 only after four data signals have been applied to the four-stage counter 430 by the pulse height analyzer 22. Accordingly, the number of signals developed by the pulse height analyzer 22 will be divided by an effective dot factor of 4 before being applied to the monostable multivibrator 156. Each signal applied to the monostable multivibrator 164 causes the printer solenoid 29 to be energized to cause a dot to be printed.

Although one embodiment of the invention has been described and illustrated, it is apparent to one skilled in the art that various changes and modifications may be made without departing from the spirit and scope of the invention.

Having thus described our invention, we claim:

1. In a scintillation system, a radiation detector including circuitry for developing a train of electrical pulses representative of the value of radiation activity measured by the detector, the improvement comprising:

counting circuit means coupled to said detector circuitry for developing a calibrate signal having a value representative of the number of electrical pulses received during a predetermined interval of time;

dot factor circuit means coupled to said counting circuit means and to said detector circuitry for developing a train of output signal having a value representative of the value of a said train of electrical pulses developed by said detector circuitry divided by a factor having a value representative of the value of a said calibrate signal; and, recording means coupled to said dot factor circuit means for providing an output presentation which takes the form of a pattern of discrete dots representative of the value of said output signals to provide a visual representation of measured radiation activity.

2. An apparatus as defined in claim 1, wherein said dot factor circuit means includes gating means, a binary point counter including means for counting a number of predetermined time intervals, and memory circuit means for actuating said gating means to preset said counting circuit means in response to the number of counted time intervals to thereby cause the pattern of calibrate signals developed by said counting circuit means to be representative of the averge number of counts per interval of time.

3. An apparatus as defined in claim 2 wherein said counting circuit means is a binary counter and said gating means includes circuit means for setting the binary point of said binary counter.

4. An apparatus as defined in claim 2 including a reference storage register coupled to said counting circuit means for storing a pattern of electrical signals representative of the average number of counts per interval of time; and, digital-to-analog circuit means coupled to said reference storage register for converting the pattern of signals stored in said reference storage register to signals of analog form for driving said recording means.

5. A scintillation system comprising:

a radiation detector including circuitry for developing electrical pulses representative of the value of radiation activity measured by the detector;

counting circuit means coupled to said detector circuitry for developing a pattern of calibrate signals having a value representative of the number of electrical pulses received during a predetermined interval of time;

dot factor circuit means coupled to said counting circuit means for developing a factor signal having a value representative of the value of a said pattern of calibrate signals;

divider circuit means coupled to said counting circuit means and to said dot factor circuit means for developing a train of output signals substantially equal to the number of electrical pulses developed by said detector circuitry divided by a said factor signal; and, recording means coupled to said divider circuit for providing an output presentation which takes the form of a pattern of discrete dots representative of the values of said output signals to thereby provide a visual representation of measured radiation activity.

6. An apparatus as defined in claim 5 wherein said dot factor circuit means includes gating means, a binary point counter including means for counting a number of predetermined time intervals, and memory circuit means for actuating said gating means to preset said counting circuit means in response to the number of counted time intervals to thereby cause the pattern of calibrate signals developed by said counting circuit means to be representative of the average number of counts per interval of time.

7. An apparatus as defined in claim 6 wherein said counting circuit means is a binary counter and said gating means includes circuit means for setting the binary point of said binary counter.

8. An apparatus as defined in claim 6 including a reference storage register coupled to said counting circuit means for storing a pattern of electrical signals representative of the average number of counts per interval of time; and, digital-to-analog circuit means coupled to said reference storage register for converting the pattern of signals stored in said reference storage register to signals of analog form for driving said recording means.

9. An apparatus as defined in claim 7 including a reference storage register coupled to said counting circuit means for storing a pattern of electrical signals representative of the average number of counts per interval of time; and digital-to-analog circuit means coupled to said refrence storage register for converting the pattern of signals stored in said reference storage register to signals of analog form for driving said recording means.

10. A scintillation system comprising:

a radiation detector including circuitry for developing electrical pulses representative of the value of radiation activity measured by the detector;

counting circuit means coupled to said detector circuitry for developing a pattern of calibrate signals having a value representative of the number of electrical pulses received during a predetermined interval of time;

dot factor circuit means coupled to said counting circuit means for developing a factor signal having a value representative of the value of a said pattern of calibrate signals;

divider circuit means coupled to said counting circuit means and to said dot factor circuit means for developing a train of output signals substantially equal to the number of electrical pulses developed by said detector circuitry divided by a said factor signal; and, recording means coupled to said divider circuit for providing an output presentation which takes the form of a pattern of discrete dots representative of the values of said output signals to thereby provide a visual representation of measured radiation activity.

11. An apparatus as defined in claim 10 wherein said divider circuit means includes gating means for setting a binary point of said counting circuit means, a binary point counter including means for counting a number of predetermined time intervals, and memory circuit means for actuating said gating means in said counting circuit means to set the binary point of said counting circuit means in response to the number of counted time intervals, to thereby cause the pattern of calibrate signals developed by said counting circuit means to be representative of the average number of counts per interval of time.

12. An apparatus as defined in claim 11 wherein said counting circuit means is a binary counter and said gating means includes circuit means for setting the binary point of said binary counter.

13. An apparatus as defined in claim 11 including a reference storage register coupled to said counting circuit means for storing a pattern of electrical signals representative of the average number of counts per interval of time; and, normalizing circuit means coupled to said reference storge register for developing a said calibrating signal having a value representative of a said pattern of electrical signals stored in said reference storage register.

14. A method of operating a scintillation scanner to automatically optimize the spacing between discrete dots which form a pattern representative of measured radiation activity comprising the steps of:

developing electrical pulses representative of the value of radiation activity measured by a detector;

developing a pattern of calibrate signal having a value representative of the number of electrical pulses received during a predetermined interval of time;

developing a factor signal having a value representative of the value of a said pattern of calibrate signals;

dividing the number of electrical pulses developed by said detector circuitry by a said factor signal to develop output signals;

printing a pattern of discrete dots representative of the values of said output signals to thereby provide a visual representation of measured radiation activity.

* * * * *